United States Patent [19]

Meszaros

[11] 4,076,498
[45] Feb. 28, 1978

[54] DYED POLYETHYLENE TEREPHTHALATE TEXTILE FIBERS WITH GREENISH BLUE SHADE

[75] Inventor: Laszlo A. Meszaros, Charlotte, N.C.

[73] Assignee: Martin Marietta Corporation, Bethesda, Md.

[21] Appl. No.: 724,850

[22] Filed: Sep. 20, 1976

[51] Int. Cl.$^2$ .................. C09B 27/00; D06P 1/02
[52] U.S. Cl. ........................................ 8/41 C; 8/44; 8/179; 260/206
[58] Field of Search .............. 8/41 C, 44, 179; 260/206

[56] References Cited

U.S. PATENT DOCUMENTS

| 2,083,308 | 6/1937 | Senn | 260/97 |
| 2,289,413 | 7/1942 | Ellis et al. | 8/48 |
| 3,122,410 | 2/1964 | Mueller et al. | 8/41 R |
| 3,232,693 | 2/1966 | Lange et al. | 8/26 |
| 3,342,803 | 9/1967 | Artz et al. | 8/50 |

FOREIGN PATENT DOCUMENTS 533,439   2/1941   United Kingdom.

OTHER PUBLICATIONS

Venkataraman, K., "The Chemistry of Synthetic Dyes," vol. III, (Academic Press, 1970), pp. 434–437.

*Primary Examiner*—A. Lionel Clingman
*Attorney, Agent, or Firm*—Wilton Rankin; John A. Crowley, Jr.

[57] ABSTRACT

Polyethylene textile fibers dyed with the dyestuff resulting from coupling equimolar amounts of diazotized

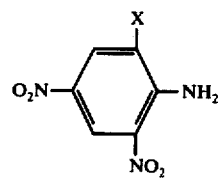

and the coupling components obtained by reacting 3-amino-4-methoxyacetanilide or 3-amino-4-ethoxyacetanilide with diethyl sulfate, wherein X is Cl or Br are disclosed. Said fibers are a desirable greenish blue shade, with good fastness properties, and a very green flare under incandescent light.

5 Claims, No Drawings

DYED POLYETHYLENE TEREPHTHALATE TEXTILE FIBERS WITH GREENISH BLUE SHADE

The present invention relates to textile fibers, and more particularly to polyethylene terephthalate textile fibers dyed with certain blue dyes.

The polyethylene terephthalate textile fibers of the present invention are particularly characterized in that they have been dyed with the dyestuff resulting from coupling equimolar amounts of diazotized

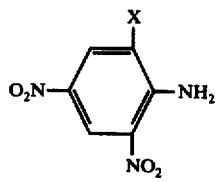

and the coupling components obtained by reacting

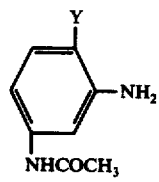

with diethyl sulfate, wherein X is Cl or Br, and Y is methoxy or ethoxy.

The textile fibers of the present invention are particularly useful for making clothing, are greenish blue, have a very geen flare under incandescent light, have good levelness of shade, and generally speaking have good fastness properties.

The dyestuffs employed in the present invention are disclosed generally in U.S. Pat. No. 2,083,308, issued June 8, 1937.

Prior to the present invention, it was required to use more expensive dyes, such as anthraquinone types, than those dyes used in the present invention, in order to obtain polyethylene terephthalate with a desirable greenish blue shade that flared very green under incandescent light and had generally good fastness properties.

The following is a more detailed description of a method for practicing the present invention.

The dyestuffs employed in the present invention are blue disperse dyestuffs which may be prepared as follows.

2-Bromo-4,6-dinitroaniline or 2-chloro-4,6-dinitroaniline may be diazotized in the conventional manner, for example by dissolving sodium nitrite in concentrated sulfuric acid; heating mildly to dissolve; cooling to 0°-2° C.; adding the 2-bromo-4,6-dinitroaniline or 2-chloro-4,6-dinitroaniline gradually; stirring several hours at 0°-3° C.; and maintaining below 5° C. until ready for use by adding ice internally.

The coupling components used in making the dyestuff employed in the present invention may be prepared by reacting one molecular proportion of 3-amino-4-methoxyacetanilide or 3-amino-4-ethoxyacetanilide with two molecular proportions of diethyl sulfate and two molecular proportions of sodium carbonate, in isopropanol.

It will be understood by those with skill in organic chemistry that when 3-amino-4-methoxyacetanilide or 3-amino-4-ethoxyacetanilide is reacted with diethyl sulfate and sodium carbonate as above, the major coupling component resulting is the product obtained by substituting each of the two hydrogen atoms of the 3-position amino group with ethyl groups, but that is not a 100% complete reaction, and therefore small amounts of unreacted 3-amino-4-methoxyacetanilide or 3-amino-4-ethoxyacetanilide, as well as small amounts of the product obtained by substituting only one ethyl group for one hydrogen of the 3-position amino will be present, and all are couplers resulting from the reaction, and end up as part of the dyestuff employed and on the fiber.

Equimolar amounts of the foregoing couplers and diazo are coupled in the conventional manner, to form the dyestuff which is then dispersed and dyed onto the polyethylene terephthalate in conventional manner.

The following are illustrative embodiments of the present invention.

EXAMPLE 1

Diazotize 2-bromo-4,6-dinitroaniline by charging into a 250 ml. beaker 36 ml. 96% sulfuric acid, cooling to 10°-12° C., adding 3.2 gms. sodium nitrite, warming to 70° C. gradually over a period of 10 minutes, cooling to 0°-2° C., adding 11 gms. 2-bromo-4,6-dinitroaniline, during 15 minutes while maintaining 2°-3° C., stirring 3 hours at 0°-3° C., and adding 80 gms. ice while maintaining the diazo below 5° C. for 25 minutes.

The coupling components are prepared by charging into a 1 liter flask 250 gms. isopropyl alcohol, adding 90 gms. 3-amino-4-methoxyacetanilide, adding 106 gms. sodium carbonate, heating to reflux, holding at reflux 20 minutes, adding at reflux 169 gms. diethyl sulfate gradually during 5-6 hours, holding at reflux for 4 hours after the diethyl sulfate has dissolved, cooling to 60° C., quenching into 1,000 gms. ice and water, stirring at less than 5° C. for 1 hour, collecting the solids by filtration, washing the solids lightly with water, and air drying the resulting couplers, which contain 14.92% ash.

Equimolar amounts of the diazo may be coupled by adding one-fourth of the diazo of the first paragraph of this Example 1 to 2.8 gms. of the product produced in the second paragraph of this Example 1 (couplers), adding 25 ml. 1:5 acid (1 part propionic acid and 5 parts acetic acid by volume) and optionally 1 drop of emulsifying agent at 0° C. gradually during 10 minutes, adding sodium acetate, approximately 30 gms., until Congo red test paper turns faintly violet, stirring overnight while cooling externally at 0° C., diluting to 380 ml. with ice and water, stirring 1 hour at 0° C., collecting the solids by filtration, washing the solids with 4 liters cold water, and drying the resulting blue dyestuff solids at 45° C.

EXAMPLE 2

This example is the same as Example 1 above, except that 9.13 gms. 2-chloro-4,6-dinitroaniline is substituted for the 2-bromo-4,6-dinitroaniline employed in Example 1.

EXAMPLE 3

This example is the same as Example 1 above, except that 97 gms. 3-amino-4-ethoxyacetanilide is substituted for the 90 gms. 3-amino-4-methoxyacetanilide used in Example 1, and except that 2.97 gms. of the resulting couplers is substituted for the 2.8 gms. of couplers used in Example 1.

The dyestuffs of Examples 1-3 above may be employed to dye polyethylene terephthalate textile fibers to greenish blue shades, in any range from pale to dark, depending on amount of dyestuff used, by employing conventional methods for dyeing disperse dyes.

EXAMPLE 4

The dyestuffs of each of Examples 1-3 above were applied separately to three separate strands of polyethylene terephthalate textile yarn, by the conventional long bath carrier dyeing method, using emulsified o-phenylphenol carrier. Dyeings of 2% strength were prepared. The liquor to goods ratio was 40:1, and percent relates to weight of 15% aqueous dye dispersion (calculated as dispersion) in the dye liquor to weight of yarn.

All three of the resulting dyeings were greenish blue, had good levelness, and flared green under incandescent light. The dyeings from the Examples 1 and 2 dyestuffs had a trace break after 20 hours, and the Example 3 dye had a slight break after 20 hours, of testing in the Fade-Ometer ® carbon arc light fastness tester. The dyeing made from the Example 1 dyestuff had very good sublimation fastness, and the dyeings made from the Examples 2 and 3 dyes had good sublimation fastness, when tested 30 seconds at 400° F.

Obvious modifications and equivalents of the invention herein described will occur to those with skill in the dyeing art; for example addition of one or more other dyestuffs, to those described herein, in the dyeing process, so as to obtain differing shades and hues. It should be understood that all such modifications and equivalents are within the scope of the present invention, and that the present claims are not limited so as to exclude coverage of polyethylene terephthalate textile fibers dyed with the dyestuffs recited in the claims, or equivalents thereof, plus other dyestuffs.

What is claimed is:

1. Polyethylene terephthalate textile fibers dyed with the dyestuff resulting from coupling equimolar amounts of diazotized

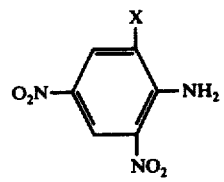

and the coupling components obtained by reacting

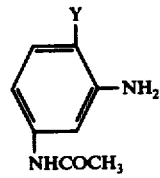

with diethyl sulfate, wherein X is Cl or Br, and Y is methoxy or ethoxy.

2. Polyethylene terephthalate textile fibers are defined in claim 1, and wherein X is Br.

3. Polyethylene terephthalate textile fibers dyed with the dyestuff resulting from coupling equimolar amounts of diazotized 2-bromo-4,6-dinitroaniline and the coupling components obtained by reacting 3-amino-4-methoxyacetanilide with diethyl sulfate.

4. Polyethylene terephthalate textile fibers dyed with the dyestuff resulting from coupling equimolar amounts of 2-chloro-4,6-dinitroaniline and the coupling components obtained by reacting 3-amino-4-methoxyacetanilide with diethyl sulfate.

5. Polyethylene terephthalate textile fibers dyed with the dyestuff resulting from coupling equimolar amounts of diazotized 2-bromo-4,6-dinitroaniline and the coupling components obtained by reacting 3-amino-4-ethoxyacetanilide with diethyl sulfate.

* * * * *